United States Patent

[11] 3,574,343

| [72] | Inventor | Joel L. Cutler<br>Huntingdon Valley, Pa. |
|---|---|---|
| [21] | Appl. No. | 836,347 |
| [22] | Filed | June 25, 1969 |
| [45] | Patented | Apr. 13, 1971 |
| [73] | Assignee | Cutler Davis Products, Inc.<br>Philadelphia, Pa. |

[54] MIXING SYSTEM
11 Claims, 1 Drawing Fig.
[52] U.S. Cl............................................... 259/18,
137/3, 137/255
[51] Int. Cl................................................. B01f 5/00,
B01f 7/00, B01f 15/02,
[50] Field of Search........................................... 259/18, 36,
137/2, 3, 255, 256, 262, 263, 268, 48, 16; 239/310

[56] References Cited
UNITED STATES PATENTS

| 2,724,581 | 11/1955 | Pahl et al. ..................... | 259/18 |
| 3,037,707 | 6/1962 | Ligon............................ | 239/310 |
| 3,151,843 | 10/1964 | Cowley.......................... | 259/18 |
| 3,259,141 | 7/1966 | Brendon....................... | 137/3 |
| 3,273,576 | 9/1966 | Fluegal et al. ................ | 137/2 |

Primary Examiner—Leonard D. Christian
Attorney—Arthur I. Neustadt

ABSTRACT: A mixing system wherein liquid from a supply vat is pasteurized and then successively combined with additives in first and second batch vats. A control mechanism operating on a predetermined time basis is utilized to switch from one vat to the other when one vat is filled, to introduce additives into the vat, to mix the pasteurized liquid and the additives with an agitator, and to evacuate the filled vat while the other vat is being filled in order to prepare for the next cycle of operation. In addition, the control mechanism diverts the unbatched pasteurized liquid to the supply vat in the event that the liquid in the supply vat falls below a predetermined level.

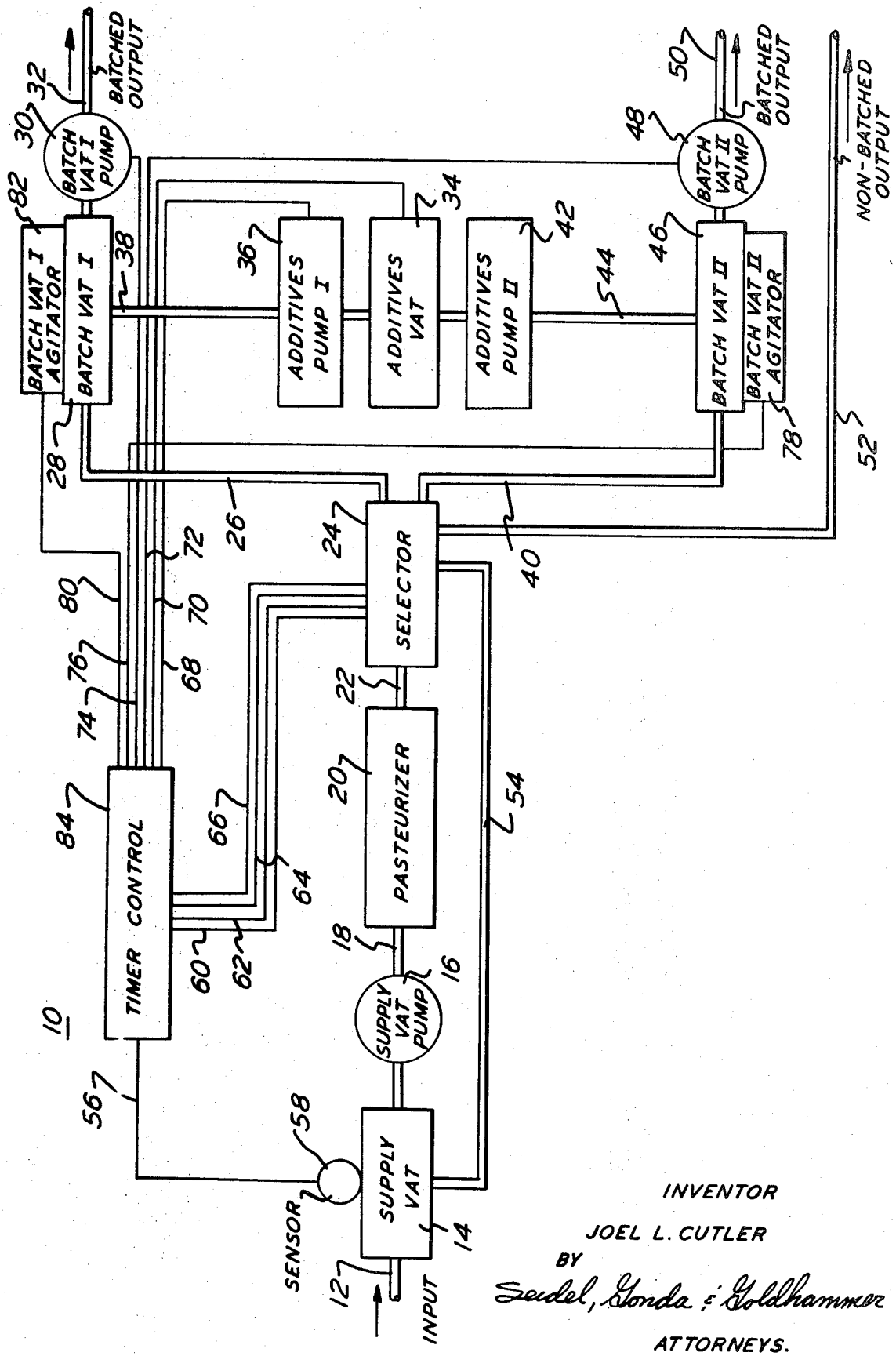

MIXING SYSTEM

This invention relates to a mixing system. More particularly, this invention relates to a mixing system wherein liquid from a supply vat is pasteurized and then successively combined with additives in a plurality of batch vats.

More particularly, this invention pertains to a mixing system wherein the entire operation of the system is under the control of a mechanism operating on a predetermined time basis.

Pumping liquid through a pasteurizer presents certain problems. The pasteurizer kills bacteria by exposing the bacteria to heat for a predetermined period of time. If the bacteria is exposed for too long a time, the liquid in which the bacteria is carried will be damaged rendering it unsuitable for further use. Accordingly, it is necessary that the liquid be pumped through the pasteurizer at a constant velocity.

Since a constant velocity through the pasteurizer must be maintained, provisions must be made for disposing of the output of the pasteurizer without disturbing the flow therethrough. Prior art systems have done this by utilizing flow meters to gauge the flow past a predetermined point. Thus, if the output of the pasteurizer is used to fill a vat having a capacity of $X$ gallons, the flow meter detects when $X$ gallons have flowed past a predetermined point. When this occurs, the filled vat is disconnected from the pasteurizer output.

Certain problems have arisen in the prior art with respect to the use of these flow meters. Firstly, almost all flow meters are expensive. Secondly, these flow meters are difficult to keep clean. Since these flow meters are immersed in liquid that will later be utilized for human consumption, the difficulties of maintaining cleanliness present significant problems. In addition, it has been found that prior art flow meters are not as accurate as desirable. Therefore, it is necessary that vats not be entirely filled in order to avoid the occasional overflow.

Accordingly, it is an object of the present invention to provide a mixing system wherein the mixing may be accurately controlled.

It is a further object of the invention to provide a mixing system wherein the mixing may be controlled on a predetermined time basis.

It is an additional object of the invention to provide a mixing system wherein the entire system may be controlled on a predetermined time basis from a central location.

It is still a further object of the present invention to provide a mixing system utilizing a pasteurizer wherein it is assured that liquid will always be available to be pumped through the pasteurizer.

Other objects will appear hereinafter.

The apparatus of the present invention achieves these objectives and many others by utilizing a mixing system wherein all control signals are generated on a predetermined time basis. Because all control signals are so generated, there is no need to employ any flow meters with their attendant disadvantages. Thus, a control system operating on a predetermined time basis can be manufactured less expensively than a control system utilizing flow meters. Since a predetermined time basis control system need not physically detect the flow of liquid through the system, there is no need to install flow meters to make physical contact with the liquid processed in the system. This is important because there are no flow meters in the flow stream to keep clean. Furthermore, a predetermined time basis control system is more accurate than a corresponding system utilizing flow meters. This means that vats may be filled closer to capacity without risking the dangers of overflow.

The control system of the present invention maintains a constant flow through the pasteurizer by maintaining the liquid in the supply vat above a predetermined level. If this level were not so maintained, there would be no liquid to pump out the liquid in the pasteurizer. This constant flow is achieved by diverting to the supply vat the flow of pasteurized unbatched liquid whenever the volume of liquid in the supply vat falls below a predetermined level.

For the purpose of illustrating the invention, there is shown in the drawings a form which is presently preferred, it being understood however, that the invention is not limited to the precise arrangements and instrumentalities shown.

The FIGURE shows a block diagram of the mixing system of the present invention.

The mixing system of the present invention is generally designated as 10 in the FIGURE. The liquid that is to be pasteurized and batched is introduced into supply vat 14 through input conduit 12. Pump 16 pumps the liquid from supply vat 14 through conduit 18 to pasteurizer 20. Since pump 16 operates continuously, the liquid within pasteurizer 20 is forced through conduit 22 into selector 24.

Selector 24 comprises a liquid switching arrangement wherein there is one input and four outputs. When one of the outputs is in an open position, the other three outputs are in closed positions. These four outputs consist of conduits 26, 40, 52 and 54.

As mentioned hereinabove, there must be a constant flow of liquid through pasteurizer 20. In order to maintain this constant flow, pump 16 must be able to pump liquid into pasteurizer 20 in order to force the pasteurized liquid within pasteurizer 20 into conduit 22. This is accomplished by maintaining an adequate reserve within supply vat 14. This is achieved by continuously monitoring the amount of liquid within supply vat 14. If the liquid within supply vat 14 falls below a predetermined level, selector 24 is activated by control means explained hereinafter to divert to conduit 54 the flow of pasteurized liquid. Conduit 54 links selector 24 to supply vat 14. Thus, supply vat 14 is always assured of enough liquid to be able to maintain a constant flow through pasteurizer 20.

If there exists a sufficient reserve within supply vat 14, the pasteurized liquid is channeled to conduits 26, 40 or 52. Conduit 26 leads into batch vat I which is designated in the FIGURE as 28. Additives from additives vat 34 are pumped by pump 36 through conduit 38 into batch vat I. In order to effect a thorough mixing of the additives with the pasteurized liquid, agitator 82 is maintained in continuous operation while the mixing is effected. The batched liquid consisting of the pasteurized liquid with the additives mixed therein is pumped out of batch vat I by pump 30. The batched liquid is pumped to utilization means (not shown) through outlet conduit 32.

Alternatively, selector 24 may be controlled to direct the flow of pasteurized liquid to conduit 40. Conduit 40 leads into batch vat II which is designated as 46 in the FIGURE. Additives may be pumped from additives vat 34 by pump 42 through conduit 44 to mix with the pasteurized liquid within batch vat II. In order to aid the mixing of the additives with the pasteurized liquid, agitator 78 is maintained in continuous operation while the mixing is effected. The batched liquid consisting of the pasteurized liquid with the additives mixed therein is pumped from batch vat II by pump 48 through outlet conduit 50 to utilization means (not shown).

In some instances, there is a demand for pasteurized liquid that has not been mixed with any additives. Accordingly, the mixing system of the present invention contains conduit 52 which bypasses the additives mixing stage. Thus, selector 24 may be actuated to introduce unbatched pasteurized liquid into conduit 52 wherein it may be conveyed to utilization means (not shown).

In accordance with the present invention, the controls for the mixing system described hereinabove are provided by timer control 84. Timer control 84 may be a conventional clock control mechanism wherein control signals are generated over certain output lines at various predetermined times.

In accordance with the mixing system of the present invention, the liquid introduced into supply vat 14 is of a known density. Furthermore, this liquid is homogeneous and is therefore of a constant density. Therefore, pump 16 is able to pump the unpasteurized liquid at a constant volume and pressure. Accordingly, since the capacities of the conduits and components are known, the amount of liquid pumped through the system will also be known. Thus, it is a simple matter to compute that $X$ number of minutes are required to fill a batch vat of a certain capacity.

Accordingly, it is possible to control the operation of all the components of the mixing system on a predetermined time basis. In practice, this has proved to be a most accurate way of effecting control functions. Furthermore, there is no necessity to maintain flow meters within the flow stream of the system. As stated above, these flow meters possess many disadvantages.

It is well within the scope of the invention to provide a timer control 84 that is adjustable, i.e. capable of being set to vary the predetermined times at which control signals are generated. For example, if it is desired to process a liquid having a different density through the mixing system, different predetermined times may be set into timer control 84. Similarly, if the capacities of the batch vats are changed, it is a simple matter to similarly change the predetermined times set into timer control 84.

As shown in the FIGURE, timer control 84 is connected to selector 24 over conductors 60, 62, 64 and 66. The signal transmitted by conductor 60 opens conduit 54 and closes the open conduit. Similarly, the signal transmitted by conductor 62 opens conduit 52 and closes the open conduit. In like manner, the signal transmitted by conductor 64 opens conduit 40 and closes the open conduit. Also in like manner, the signal transmitted by conductor 66 opens conduit 26 and closes the open conduit.

Timer control 84 is connected by conductor 56 to sensor 58. Sensor 58 continuously monitors the amount of liquid within supply vat 14. When the liquid within supply vat 14 falls below a predetermined level, sensor 58 generates a signal which causes timer control 84 to open conduit 54 and close the open conduit. This serves to replenish the liquid within supply vat 14. When the amount of liquid within supply vat 14 exceeds the predetermined level, sensor 58 causes timer control 84 to revert to normal operation.

Timer control 84 is also utilized to actuate the other components of the mixing system of the present invention. Timer control 84 is connected to agitator 82 by conductor 80; to agitator 78 by conductor 76; to pump 30 by conductor 74; to pump 48 by conductor 72; to pump 42 by conductor 70; and to pump 36 by conductor 68.

In normal operation, timer control 84 is set to produce the maximum amount of batched liquid. In order to effect maximum output, timer control 84 controls the operation of selector 24, agitators 78 and 82, and pumps 30, 36, 42 and 48. Thus, in order to mix the pasteurized liquid with the additives within batch vat I, the controls are operated in the following manner. Since the mixing takes place within batch vat I, agitator 82 is maintained in an "on" position while pump 30 is maintained in an "off" position. In order to maintain the flow of additives from additives vat 34 to batch vat I, pump 36 is maintained in an "on" position. The operation of the components of the batch vat II system will be explained hereinafter.

Since the density of the liquid within supply vat 14 is known and since the capacities of the various components of the mixing system are similarly known, it can readily be calculated that within $X$ minutes, batch vat I will be filled to capacity. Accordingly, timer control 84 is preset to switch the flow of pasteurized liquid from batch vat I to batch vat II after $X$ minutes have elapsed.

This is done in the following manner. Selector 24 opens conduit 40 and closes conduit 26. Pump 42 is actuated in order to introduce additives from additives vat 34 into batch vat II. In order to effect the proper mixing of the additives with the pasteurized liquid, agitator 78 is actuated. Pump 48 is maintained in an "off" position.

At the same time that the batch vat II segment of the system is actuated, the batch vat I segment of the system is deactuated. Thus, agitator 82 and pump 36 are deactuated. In order to evacuate batch vat I in preparation for the next cycle, pump 30 is actuated.

As mentioned above, it is essential that a constant flow of liquid be maintained through pasteurizer 20. Thus, after batch vat I has been filled to capacity, it is essential that batch vat I be evacuated before batch vat II has been filled to capacity. This is accomplished by maintaining pump 30 in an "on" position while batch vat II is being filled. Pump 30 is designed so as to be capable of completely evacuating batch vat I before batch vat II has been filled. This is effected by timer control 84 which initiates the operation of pump 30 when selector 24 diverts the flow of pasteurized liquid to batch vat II. In like manner, pump 48 is actuated whenever selector 24 diverts the flow of pasteurized liquid to batch vat I.

As mentioned above, in some situations it is desirable to produce pasteurized liquid without any additives contained therein. If this is desired, the entire output of pasteurizer 20 may be channeled into conduit 52. Alternatively, the output of pasteurizer 20 may be divided between batch vat I and conduit 52. Therefore, when ever the output of pasteurizer 20 is channeled into conduit 52, pump 30 evacuates batch vat I to prepare for the next cycle. These various control cycles may be readily set into timer control 84 by the operation of manual switches. Alternatively, the selection of various control cycles may be effected electronically by remote control using various known means.

As mentioned hereinabove, if the liquid within supply vat 14 falls below a predetermined level, selector 24 is actuated to divert the flow of pasteurized liquid to conduit 54 to replenish the supply within supply vat 14. This halts the timing mechanism within timer control 84. When the liquid within supply vat 14 exceeds the minimum acceptable level, timer control 84 resumes the control cycle at the point at which the interruption took place. When the control cycle is interrupted, the agitators, the additives pumps, and the batch vat pumps are deactuated.

The structures of the various components of the mixing system of the present invention are entirely conventional. Thus, prior art pumps, agitators and vats may be utilized. In addition, selector 24 may be any conventional one channel input four channel output flow diverter. Similarly, timer control 84 may be any conventional adjustable clock control mechanism capable of actuating various switches at various predetermined times. Similarly sensor 58 may be any conventional volume or weight indicator.

The present invention may be embodied in other specific forms without departing from the spirit or essential attributes thereof. For example, the present invention may be utilized to maximize the output of a conventional mixing system. The flow of liquid into and out of a plurality of batch vats may be controlled on a predetermined time basis so that one vat is being evacuated while another vat is being filled thus maximizing the output of the system.

From the above, it may be seen that applicant has invented a novel and efficient mixing system that is controlled on a predetermined time basis.

I claim:

1. A mixing system comprising a supply vat, means to introduce liquid into said supply vat, selector means, means to continuously pump liquid from said supply vat to said selector means, first and second batch vats, valve means connecting said selector means to said first and second batch vats, means to introduce additives into said first and second batch vats, means to evacuate said first and second batch vats, and control means operable on a predetermined time basis to selectively connect one of said first and second batch vats to said selector means, said control means including means to introduce additives into said selected one of said first and second batch vats, said control means further including means to evacuate said nonselected one of said first and second batch vats.

2. A mixing system in accordance with claim 1 including pasteurizing means, and means to continuously pump liquid from said supply vat through said pasteurizing means to said selector means.

3. A mixing system in accordance with claim 2 including means to sense when the liquid within said supply vat falls below a predetermined level, and means to direct the flow of liquid from said selector means to said supply vat whenever the liquid within said supply vat falls below a predetermined level.

4. A mixing system in accordance with claim 3 including first and second agitators operatively disposed with respect to said first and second batch vats, said control means including means to selectively activate one of said first and second actuators in response to the connection of said selector means to one of said first and second batch vats.

5. A mixing system in accordance with claim 4 including means to bypass said first and second batch vats in order to produce pasteurized nonbatched liquid.

6. A mixing method comprising introducing liquid into a supply vat, continuously transmitting liquid from the supply vat to a selector means selectively transmitting liquid from the selector means to a selected one of two batch vats, selectively introducing additives into the selected one of the two batch vats, selectively evacuating the nonselected one of the two batch vats, the steps of selectively transmitting, selectively introducing and selectively evacuating being controlled by control means operating on a predetermined time basis.

7. A mixing method in accordance with claim 6 including pasteurizing the liquid as it is transmitted from the supply vat to the selector means.

8. A mixing method in accordance with claim 7 including sensing whenever the liquid within the supply vat falls below a predetermined level and directing the liquid from the selector means to the supply vat whenever the liquid within the supply vat falls below a predetermined level.

9. A mixing method in accordance with claim 8 including selectively actuating one of two agitators on a predetermined time basis, each of the agitators being operatively associated with a different one of the two-batch vats.

10. A mixing system comprising a supply vat, means to introduce liquid into supply vat, selector means, means to continuously pump liquid from said supply vat to said selector means, first and second outputs, valve means connecting said selector means to said first and second outputs, a batch vat, said first output leading into said batch vat, means to introduce additives into said batch vat, means to evacuate said batch vat, and control means operable on a predetermined time basis to selectively connect one of said first and second outputs to said selector means, said control means including means to introduce additives into said batch vat when said first output has been selected, said control means further including means to evacuate said batch vat when said second output has been selected.

11. A timer control for a mixing system wherein liquid is continuously pumped from a supply vat to a selector means and from the selector means to one of first and second outputs, the first output being connected to a batch vat to which additives may be introduced, said timer control comprising means to selectively connect the selector means to one of the first and second outputs, means to introduce additives into the batch vat when the first output is selected, and means to evacuate the batch vat when the second output is selected.

UNITED STATES PATENT OFFICE
CERTIFICATE OF CORRECTION

Patent No. 3,574,343               Dated April 13, 1971

Inventor(s) Joel L. Cutler

It is certified that error appears in the above-identified patent and that said Letters Patent are hereby corrected as shown below:

The Assignee should be Cutler Dairy Products, Inc., not
   Cutler Davis Products, Inc.

Column 4, line 21: "when ever" should be -- whenever --.

Column 6, line 6: "two-batch" should be -- two batch --.

Column 6, line 8: "into supply vat" should be -- into sai
   supply vat --.

Signed and sealed this 14th day of December 1971.

(SEAL)
Attest:

EDWARD M. FLETCHER, JR.                ROBERT GOTTSCHALK
Attesting Officer                      Acting Commissioner of Patent